United States Patent [19]

Diefes et al.

[11] Patent Number: 5,534,875
[45] Date of Patent: Jul. 9, 1996

[54] ATTITUDE DETERMINING SYSTEM FOR USE WITH GLOBAL POSITIONING SYSTEM

[75] Inventors: Debra L. Diefes, Alexandria, Va.; Leopold C. Fan, Potomac; Charles E. Rodgers, St. Leonard, both of Md.

[73] Assignee: Adroit Systems, Inc., Alexandria, Va.

[21] Appl. No.: 77,734

[22] Filed: Jun. 18, 1993

[51] Int. Cl.$^6$ ............................ H04B 7/185; G01S 5/02
[52] U.S. Cl. ............................................. 342/357; 364/449
[58] Field of Search ............................ 342/357, 359, 342/352, 419; 455/12.1

[56] References Cited

U.S. PATENT DOCUMENTS

| | | | |
|---|---|---|---|
| 4,754,280 | 6/1988 | Brown et al. | 342/357 |
| 5,101,356 | 3/1992 | Timothy et al. | 364/449 |
| 5,359,332 | 10/1994 | Allison et al. | 342/357 |

OTHER PUBLICATIONS

Brown et al., "Interferometric Attitude Determination Using the Global Positioning System", Proceedings of 3rd Int'l Geodetic Symposium on Satellite Doppler Processing, vol. 2, Feb. 1982, pp. 1289–1302.
Lucus et al., "Attitude Determination with GPS", ION Satellite Div. Tech Meeting, Sep. 1988, pp. 85–88.
Kruczynski et al., "Using GPS to Determine Vehicle Attitude", ION Satellite Div. Tech Meeting, Sep. 1988, pp. 140–145.
R. Lucus et al., "Attitude Determination with GPS", ION GPS, Sep. 1988.
Nesbo, ION GPS "Applications of GPS Determined Attitude for Navigation", Sep. 1988.
Rath et al., "Attitude Estimation Using GPS", ION National Tech Meeting, Jan. 1989, pp. 169–178.
Kruczynski et al., ION GPS "Using GPS to Determine Vehicle Attitude USS Yorktown Test Results", 163–171.
Wells et al., "GPS: A Multipurpose System", GPS World, Jan. 1990, pp. 60–63.

Evans et al., "Platform Attitude Determination by the Use of GPS–Activities at the Naval Surface Warfare Center", ION 46th Annual Meeting, Jun. 1990, pp. 3–8.
Nesbo et al., "GPS Attitude Determination for Navigation", GPS World, Oct. 1990, pp. 37–41.
Keirleber et al., "Attitude Determination for Space Transfer Vehicles Using GPS", ION National Tech Meeting, Jan. 1991, pp. 85–101.
Ferguson et al., "Three–Dimensional Attitude Determination with the Ashtech 3DF 24–Channel GPS Measurement System", ION National Tech Meeting, Jan. 1991, pp. 35–40.
Cohen et al., "Expanding the Performance Envelope of GPS–Based Attitude Determination", Sep. 191, pp. 1001–1010.
Mercer et al., "United States Navy Applications of a GPS Attitude and Position Measurement System", Sep. 1992, pp. 783–791.
Cohen et al., "Aircraft Applications of GPS–Based Attitude Determination", Sep. 1992, pp. 775–782.
Cannon et al., "Real–Time Heading Determination Using an Integrated GPS–Dead Reckoning System", Proceedings of ION GPS, Sep. 1992, pp. 767–773.
Cohen et al., "Two Studies of High Performance Attitude Determination Using GPS: Generalizing Wahba's Problem for High Output Rates and Evaluation of Static Accuracy Using a Theodolite", ION GPS, Sep. 1992, pp. 1197–1201.

(List continued on next page.)

*Primary Examiner*—Theodore M. Blum
*Attorney, Agent, or Firm*—Collier, Shannon, Rill & Scott

[57] ABSTRACT

An attitude determining system based upon the global positioning system is disclosed, and is adapted to provide dynamic, real time three-dimensional attitude, position, and time information on any vehicle in which it is located. The system is adapted to work at high latitudes, and be immune to magnetic deviations. The attitude determining system makes use of certain hardware configurations and mathematical algorithms to overcome the limitations of the prior art, and eliminate errors related to the motion of the vehicle platform.

24 Claims, 6 Drawing Sheets

OTHER PUBLICATIONS

Martin–Neira et al., "GPS Attitude Determination of Spin Stabilized Satellites", ION GPS, Sep. 1992, pp. 757–765.

Weinman et al., "Attitude Error Estimation with an Offset GPS Antenna: Concept Validation Testing", ION GPS, Sep. 1992, pp. 747–755.

Schwartz et al., "Testing a GPS Attitude System in Kinematic Mode", ION GPS, Sep. 1992, pp. 801–809.

Lu et al., "Attitude Determination in a Survey Launch Using Multi–Antenna GPS Technology", ION National Tech Meeting, Jan. 1993, pp. 251–259.

Cohen et al., "Flight Tests of Attitude Determination Using GPS Compared Against on Inertial Measurement Unit", ION National Tech Meeting, Jan. 1993, pp. 579–587.

Martin–Neira et al., "Using GPS to Determine the Attitude of a Spacecraft", GPS World, Mar. 1993, pp. 49–66.

Laser Atlanta, Mapping and Surveying Products, ProSurvey 1000™ Laser Rangefinder.

ATTITUDE DETERMINING SYSTEM FOR USE WITH GLOBAL POSITIONING SYSTEM

GOVERNMENT RIGHTS

This invention was made with Government support under Contract No. DTRS-57-92-C-00127 awarded by the United States Department of Transportation, Transportation System Center. The Government has certain rights in this invention.

FIELD OF THE INVENTION

This invention relates generally to use of the Global Positioning System ("GPS") for providing navigational information to naval, airborne, or ground based vehicles. The invention more particularly relates to an Attitude/Azimuth Determining System for providing a vehicle with accurate position, velocity, time, attitude, heading, pitch, and roll information. In its most precise embodiment, the attitude determining system determines a vehicle's attitude through use of carrier phase interferometry of GPS signals.

BACKGROUND OF THE INVENTION

The Global Positioning System ("GPS") was conceived, developed, and deployed by the United States Department of Defense over ten years ago. The GPS' purpose was to provide air, ground, and naval users with precise position and time information. Although principally conceived for military purposes, the GPS also includes a band of signals designated for non-military use. These non-military signals may be used advantageously in numerous private and commercial applications. For example, the GPS can be used by commercial airlines and private pilots, to accurately and quickly ascertain their location. Similarly, both commercial shippers and private boatmen can use the GPS at any time to accurately determine their position, without the need for conventional points of reference, such as the magnetic poles.

The GPS is a series of 24 satellites orbiting the earth. The satellites are deployed in twelve hour orbits, and are dispersed in six orbital planes. These satellites continuously emit electronic signals—telemetry—which are received by ground based or other terrestrial receivers. By simply receiving the signal from four (4) or more orbiting GPS satellites, a properly configured receiver can accurately determine its position. This system has tremendous benefits over other positioning systems, in that it relies upon no visual, magnetic, or other point of reference. These advantages are particularly important in applications such as aviation and naval navigation which traverse polar regions where conventional magnetic navigational means are rendered less effective by local magnetic conditions.

The GPS system has many advantages over standard positioning systems which it replaces. The GPS is available 24 hours a day on a worldwide basis. There is no signal degradation, or loss of quality of positioning information at higher latitudes. Magnetic deviations and anomalies common in standard positioning systems do not exist. Typical GPS systems are fabricated of standard, solid state electronic hardware, resulting in a low cost, low maintenance system having few or no moving parts, and requiring no optics. The GPS does not require calibration, alignment, and maintenance such as conventional inertial measuring units. Further, normal GPS operation provides positioning with accuracies of about 100 meters for non-military uses. Military users can make use of encryption keys which yield position information within 10 meters.

Notwithstanding these advantages, there are still significant deficiencies in the capabilities of the GPS. For example, in naval applications, the GPS is incapable of providing information related to attitude, direction of travel, roll, and pitch. It may be appreciated that knowing that a ship is within 100 meters from running aground does not do any good if the direction of travel and attitude of the ship is unknown.

Prior art attempts to provide for attitude information in the GPS have encountered problems, principally phase measurement error. This results in degraded attitude/azimuth accuracy. Phase measurement error and attitude accuracy can be represented by the following equation:

$$\text{AZIMUTH ACCURACY} = \text{AZDOP} * \frac{1}{L} * PE$$

where
PE=phase error [mm]
L=baseline length [mm]
AZDOP (Azimuthal Dilution of Precision) is a figure of merit used to quantify the quality of information received from a set of satellites (AZDOP) due to satellite geometry. The position of the satellites has a large effect on the attitude accuracy.

$$AZDOP = \sqrt{+e, rad\ cos^2(az)*D_{11}+\sin^2(az)*D_{22}}_{+ee}$$

where the matrix $$D = (RA^T AR^T)^{-1}$$

and
az=azimuth angle
$D_{ii}$=the iith element of the D matrix
A=double difference matrix operator which ensures independence in R
R=matrix of receiver to satellite vectors
The phase error factor (PE) is the sum of several phase error inducing mechanisms. It can be expanded as follows:

$$PE = ADPE + RPME + MP + EPL$$

where
ADPE=antenna differential phase error due to antenna phase center migration and signal interaction with the baseplane.
EPL=electrical path length difference
RPME=the GPS receiver phase measurement error (the accuracy to which the receiver can measure phase).
MP=multipath (the reception of signals reflected off of objects in the antennas' environment) induced phase errors The GPS' inability to provide attitude related information, combined with accuracy problems attributable to, for example, phase measurement error, severely limits the GPS' utility. These deficiencies and other limitations of the GPS system are addressed by the invention disclosed herein. These and other objects and advantages of the subject invention will become apparent from a perusal of the Detailed Description of the Invention, the Drawings, and the claims which follow.

OBJECTS OF THE INVENTION

Accordingly, it is therefore a general object of the invention to provide an attitude determining system for use in conjunction with the GPS which will obviate or minimize difficulties of the type previously described.

It is a specific object of the invention to provide art attitude determining system which permits navigation, hydrographic surveying, ice-breaker navigation, and buoy positioning, among other position determining applications.

It is still another object of the invention to provide an attitude determining system which permits 24-hour, worldwide position and attitude determining capabilities.

It is a further object of the invention to provide an attitude determining system which does not suffer from signal degradation at high latitude s.

It is yet a further object of the invention to provide an attitude determining system which is not affected by magnetic deviations.

It is still a further object of the invention to provide an attitude determining system which is easily assembled at low cost, is modular for easy replacement of components, requires no calibration, and has no moving parts, thus requiring low maintenance.

It is yet another object of the invention to provide an attitude determining system which stands independent from any specific receiver, single board computer, or other hardware component.

These and other objects and advantages of the instant invention will become apparent from a perusal of the Detailed Description of the Invention which follows.

SUMMARY OF THE INVENTION

The invention disclosed herein relates to an attitude determining system for use in conjunction with the GPS. The attitude determining system employs hardware configurations, and algorithms for attitude determination and error correction, to create a more efficient system than available with GPS alone. The attitude determining system makes use of carrier phase interferometry to determine the attitude.

The hardware configurations referenced above include a GPS signal receiving antenna array. In a first embodiment, three antennae are arranged in two colinear baselines; one baseline being relatively long (0.85 meters) and one relatively short (0.14 meters). This configuration provides a two-dimensional attitude, showing heading and pitch. A second embodiment consists of three antennae arranged in an equilateral triangle, the sides of which are approximately 0.17 meters in length. The triangular base plane provides a three baseline configuration which adds a dimension of attitude, allowing the attitude determining system to solve for a three dimensional attitude in heading, pitch, and roll. The distance between the antennae is important and should be related to the wavelength of the GPS signal (0.1902 meters).

Information collected by the antenna array from the orbiting GPS satellites must be assimilated and corrected for errors. The attitude determining system includes an algorithm which, among other functions, reduces errors from phase measurements before calculating attitude. The attitude is calculated by first selecting the best satellite constellation—the four GPS satellites from which telemetry reception is best—from among the entire constellation of GPS satellites available at any given time. Thereafter, the attitude determining system performs a gross estimate of attitude, accurate to within about 10–50 degrees. Using double differencing of carrier phase measurements from among the three antenna baselines, attitude is determined to within –0.5 degrees. The algorithm is further adapted to eliminate or reduce errors due to fixed and drifting electrical path lengths to the antennae. The algorithm also contains an Antenna Differential Phase Error ("ADPE") correction table to reduce errors due to phase center :migration. The ADPE correction table is developed by measuring and calibrating the antennae in a controlled laboratory environment. The ADPE correction table is also used to correct phase measurement based on the incident angle of the satellite signal.

The attitude determining system of the instant invention is based on carrier phase interferometry of GPS signals to measure the signal arrival time difference between two closely separated antennae. Carrier phase interferometry refers to measuring the difference in the time that it takes a satellite signal to be received by two or more antennae spaced a known distance apart. By using the GPS satellite signal time of arrival difference, it is possible to measure which antenna is closer to each satellite. This phase difference can be used to calculate an angle between each satellite and the antenna baseline. These angles are combined with the position of each satellite and the attitude determining system to calculate the baseline attitude. Since the signal receiver provides the attitude determining system position as well as the satellite positions, it is possible to convert the satellite angles into a single attitude vector. This can be calculated as follows:

Differential Phase ($\Delta\phi$) measured by a signal receiver and the angle between a baseline vector (x) and the vector to satellite (i)($r_i$) is $\Theta$.

$$\Theta_i = \cos^{-1}(\Delta\phi_{(i)}/L)$$

$$\Psi = \begin{bmatrix} \cos(\Theta_1) \\ \bullet \\ \bullet \\ \bullet \\ \cos(\Theta_{sat}) \end{bmatrix}$$

and $$R = \begin{bmatrix} r_1 \\ \bullet \\ \bullet \\ \bullet \\ r_{Nsat} \end{bmatrix}$$

then $R\underline{x} = \Psi$ and the baseline vector can be calculated as:

$$X = (R_T R)^{-1} R_T \Psi.$$

The attitude determining system configuration could also be used in conjunction with other attitude measuring instruments. For example, an on-board inertial navigation system could be used as a back-up to, or an aid for, the attitude determining system in determining an initial attitude estimate, thereby reducing the solution time necessary to determine the attitude of the vehicle. Of course, any solution would then be based upon the inertial navigation system, and its inherent limitations.

A preferred embodiment of the invention which is intended to accomplish at least some of the foregoing objects includes an attitude determining system of the instant invention comprising at minimum the following: processor means, such as a conventional microprocessor as in a laptop, portable, or single board computer; an antenna array for collecting telemetry and other electronic signals from orbiting GPS satellites; receiver means for receiving and interpreting information collected; by said antenna array and for determining location, time, and velocity; an attitude determining mathematical algorithm loaded in said processor means for determining attitude and for screening and eliminating errors from the telemetry received from the satellites. In another embodiment, the attitude determining system includes means for measuring the incline (i.e., pitch and roll) of a vehicle carrying the attitude determining system. Input/output devices, such as a keyboard or touch sensitive liquid crystal display, are also required to provide a user interface. Each of these elements will be discussed and illustrated in greater detail in connection with the Figures and Detailed Description of the Invention presented below.

DETAILED DESCRIPTION OF THE INVENTION

Figure 1:
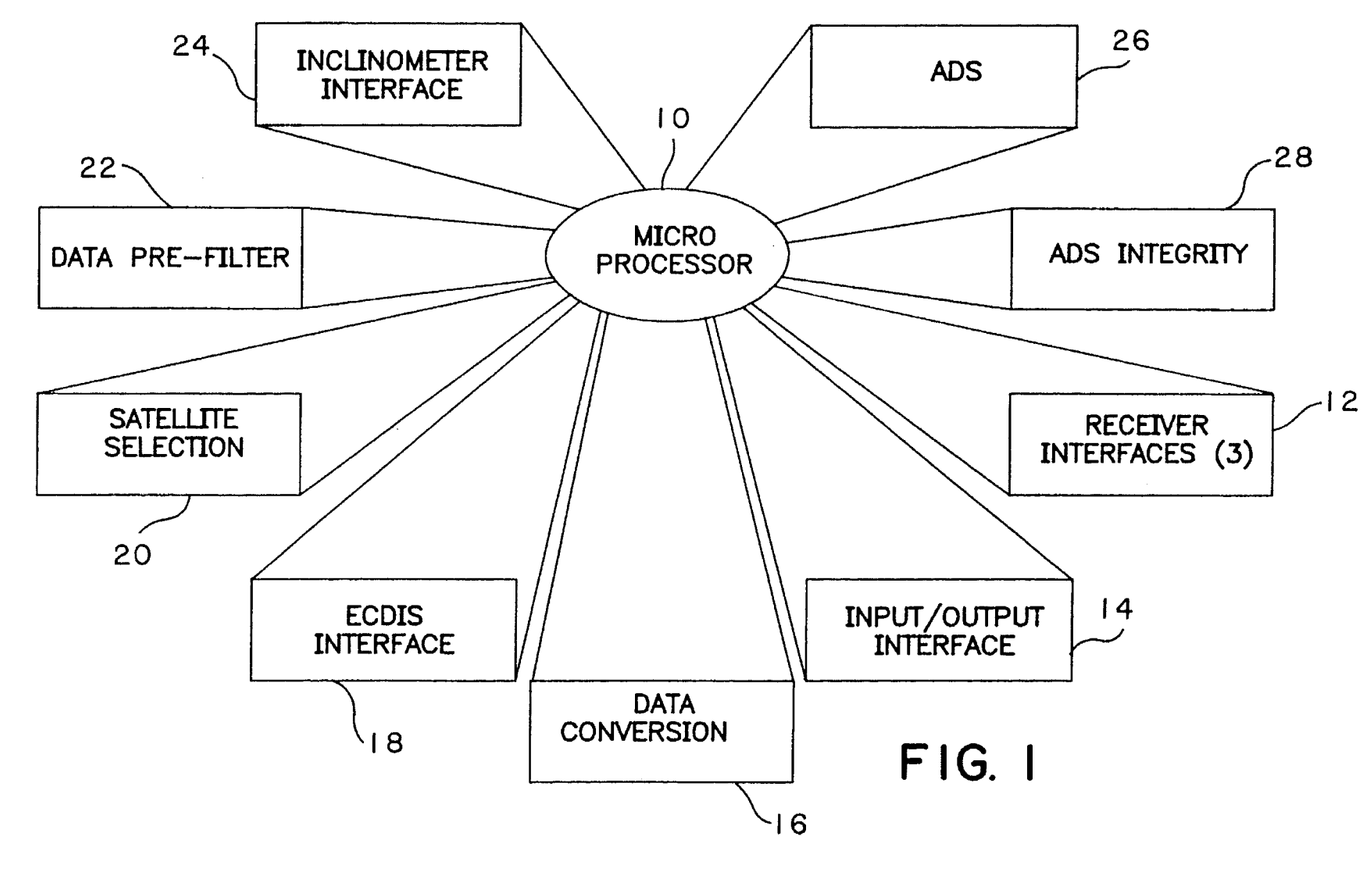
FIG. 1 is a block diagram illustrating the elements of the attitude determining system, their features and functions.

Referring now to the drawings, where like numerals indicate like parts, and initially to FIG. 1, there is illustrated therein a block diagram of the elements of a preferred embodiment of the inventive attitude determining system. The attitude determining system employs hardware components, and an algorithm for determining attitude, location, and direction of travel, and for reducing errors attributable to, for example, phase measurement error, encountered in conventional GPS. Thus the algorithm and hardware configuration of the present invention creates a more efficient system than available with conventional GPS alone.

The attitude determining system generally includes a processor means, such as a conventional microprocessor, an antenna array for collecting telemetry and other electronic signals from orbiting GPS satellites; receiver means for receiving and interpreting information collected by the antenna array and for determining location, time, and velocity; a mathematical algorithm stored in the processor memos for determining attitude and for screening and reducing errors from the telemetry received from the satellites; and, in some embodiments, means for measuring the incline (i.e., pitch and roll) of a vehicle carrying the attitude determining system. FIGS. 2–6, below, will more fully describe the hardware components of the attitude determining system, as well as the algorithm for attitude determination and error correction.

FIG. 1 illustrates the relationship between the different processes and the mathematical algorithm that comprise the attitude determining system. Each block represents a process designed to interact with the attitude determining system microprocessor, including processes to retrieve data from hardware, filter and convert data, interface with various input/output devices and perform the attitude determination, and integrity algorithms. The attitude determining system includes a microprocessor 10 with an embedded real-time operating system designed to control each discrete process, such as PSOsystem or other software operating systems known in the art. Receiver interfaces 12 electrically communicate with microprocessor 10, and controls and retrieves data from a plurality of receivers. The attitude determining system includes preferably, three receivers, illustrated in greater detail below with respect to FIGS. 2 and 6. The attitude determining system also includes an input/output interface 14 such as a lap-top computer interface. Input/output interface 14 provides a way for the attitude determining system user to input information into, and extract information from the attitude determining system. The input/output interface also allows a user to set different parameters, such as dynamic conditions, data logging requirements, or satellite selection, depending upon the particular application of the attitude determining system.

The attitude determining system further includes a process which converts all input/output data into an electronic language specific to a particular user application. For example, in FIG. 1, the attitude determining system includes a process 16 for converting data into preselected National Marine Electronic Association ("NMEA") sentences. This electronic language is standard in certain Naval applications, such as for the United States Coast Guard. In addition, the attitude determining system includes an interface process 18 for allowing the attitude determining system to communicate and provide data to an external interface, such as an Electronic Chart Display and Information System ("ECDIS") on a ship's bridge. The translation processes illustrated in blocks 16 and 18 are accomplished by software applications loaded into processor 10. Such software applications are known in the art.

Figure 4:
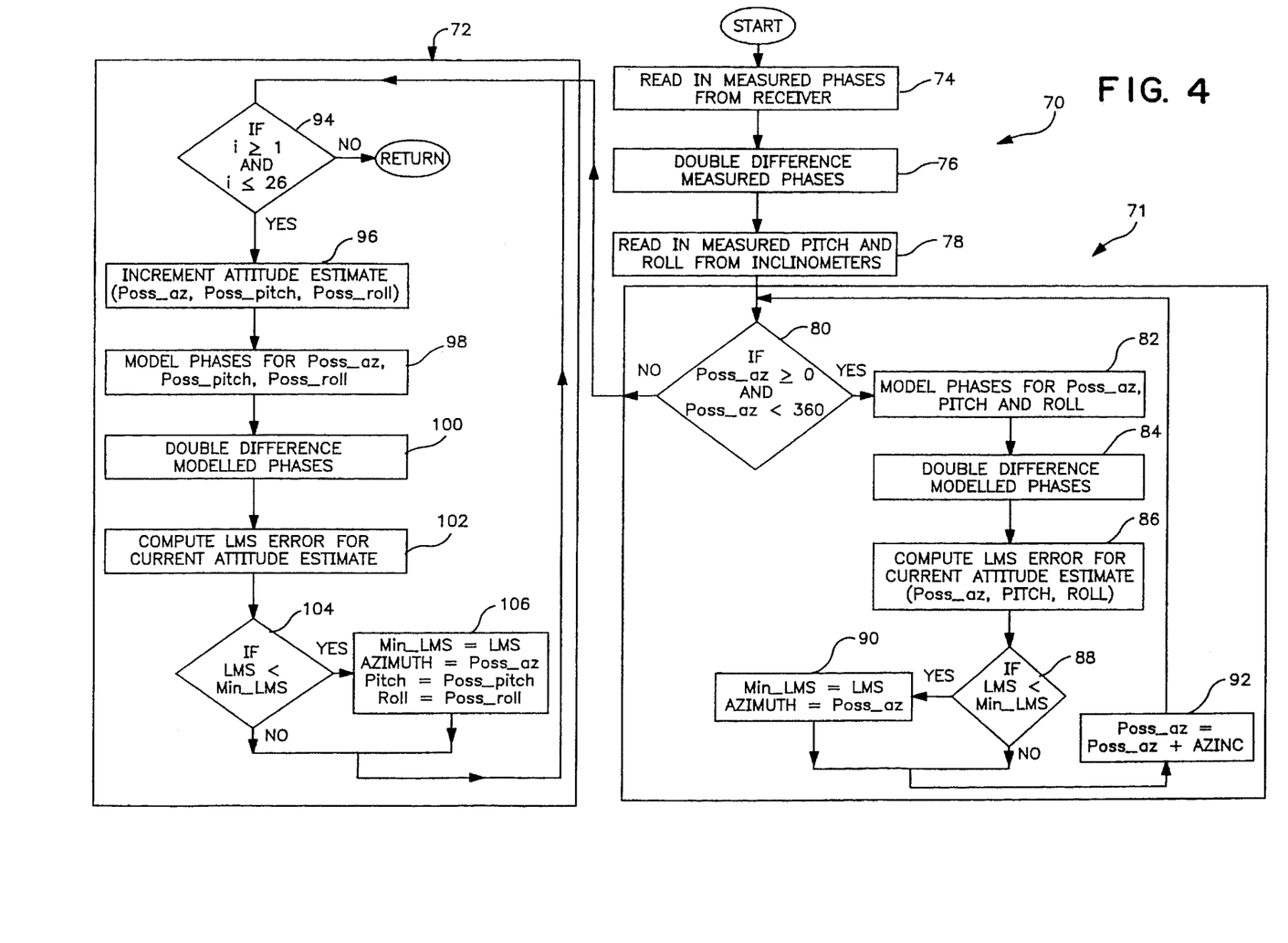
FIG. 4 is a flow diagram illustrating the attitude determining algorithm.
Figure 5:
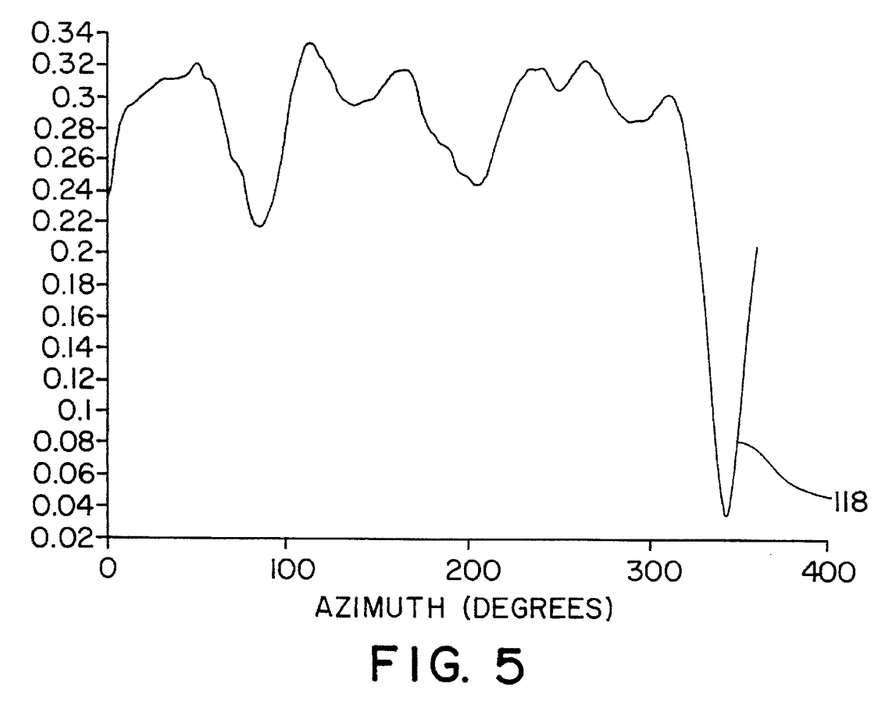
FIGS. 5 is a graph of Azimuth versus LMS error and illustrates the method by which the algorithm of FIG. 4 determines attitude wherein azimuth is plotted on the abscissa, and LMS error is plotted on the ordinate.

The attitude determining system further includes a mathematical algorithm, which comprises a plurality of discrete steps illustrated at FIGS. 4 and 5. The first step, generally indicated 20, is a satellite selection process provided for determining which four satellites from among all satellites visible at a given time, will be used in the attitude determining system algorithm. The attitude determining system can, at any time, receive information from up to ten GPS satellites. The satellite selection algorithm 20 selects the four best satellite signals available. The satellite selection, and the rest of the attitude determining system algorithm, will be described in greater detail below with respect to FIGS. 4 and 5. The attitude determining system further includes a data pre-filter, generally indicated as 22, which takes data from the hardware components of the system, such as the receivers, inclinometers, and the Electronic Chart Display and Information System, and sends it to the appropriate data structures for further processing. The data pre-filter 22 also performs certain calculations to determine if the measured data is usable. The data pre-filter 22 also converts satellite ephemeris data into earth-centered, earth-fixed coordinates (i.e., X, Y, Z coordinates with the origin of the earth's center). An inclinometer interface, generally indicated 24, reads the data collected by the inclinometers periodically, such as once per second from one or more inclinometer mounted on a receiver platform to determine the instantaneous orientation of the platform. This aids in determining the orientation of a vehicle/platform carrying the attitude determining system.

The attitude determining system algorithm embedded in process software 26 compiles data collected from the receivers, and other sources of information, such as the input/output information and the inclinometers, and computes the attitude of the platform. The algorithm for computing the attitude will be more fully described with reference to FIGS. 4 and 5. The attitude determining system integrity process 28 uses various measures of signal quality and satellite constellation quality to generate a quality measurement of the integrity of the attitude determining system calculation.

Figure 2:
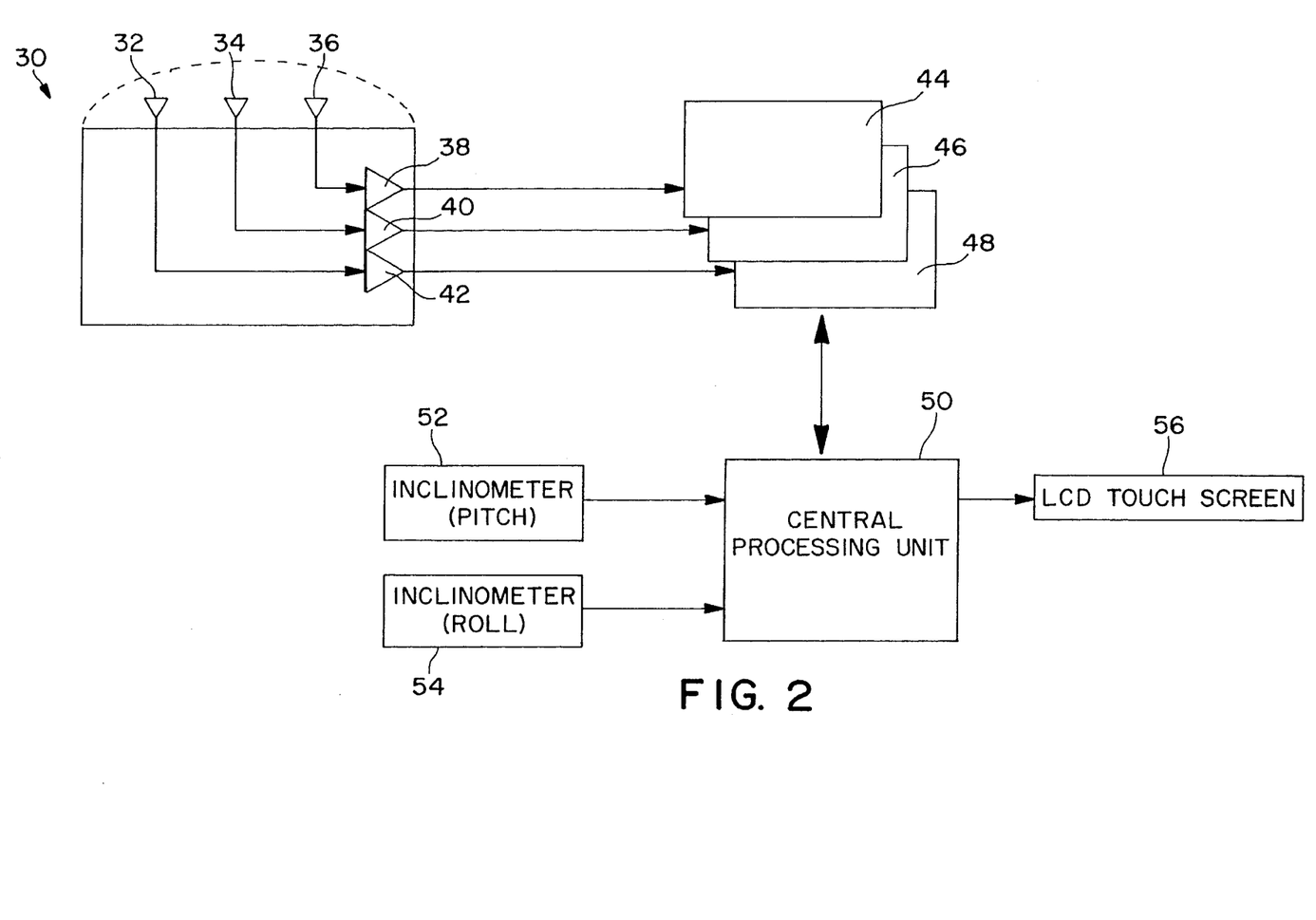
FIG. 2 is a block diagram illustrating the relationship between the various elements of the attitude determining system.

Referring now to FIG. 2, there is illustrated therein the relationship of the hardware components required for the attitude determining system. An antenna array assembly, generally indicated 30, houses an array of more than one, and preferably at least three antennas, 32, 34, and 36. The antenna array assembly 30 collects telemetry and other electronic signal information from orbiting GPS satellites. Antenna array assembly 30 also may include preamplifiers 38, 40 and 42. Preamplifier 38, 40 and 42 are provided to improve the signal-to-noise ratio of incoming collected information from the GPS satellites.

The signals received by antennas 32, 34, and 36 are transmitted to GPS receivers 44, 46 and 48. Receivers 44, 46 and 48 collect and de-code signal data from antennas 32, 34 and 36 such as carrier phase information, ephemeris data, almanac data, and pseudorange data. Receivers 44, 46 and 48 electrically communicate with a central processing unit 50, relaying collected information for processing. Central processing unit 50 may be an off-the-shelf microprocessor or single board computer equipped with a standard real-time operating system. The processing unit 50, may be, for example, a conventional 386 or 486 microprocessor of the kind known in the art. The operating system of central processing unit 50 employs the algorithm to perform the attitude and error reducing calculations, as described below with respect to FIGS. 4 and 5. The processor unit 50 contains software to perform functions such as data conversion, user interface, memory management, and other conventionally known "housekeeping" functions as described above with respect to FIG. 1, for a particular user application.

In one embodiment at least one, and preferably two, inclinometers also communicate with central processing unit 50. More specifically, a first inclinometer 52 can be used to measure the pitch of a vehicular platform housing the, antenna array 30, and a second inclinometer 54 can be used to measure the roll of the vehicular platform. Inclinometers 52 and 54 provide a measure of the orientation of the platform at the time the attitude is being computed. The inclinometers may be potentiometers or optical encoders of the type adapted to determine the pitch and roll of the platform. If the inclinometers are analog devices, such as potentiometers, an analog-to-digital converter may be necessary for it to communicate with the processor unit 50.

In addition, central processing unit 50 may electrically communicate with a user interface device 56, such as a touch-sensitive liquid crystal display. Touch-sensitive display 56 enables a user to request certain information from the processing unit 50, or to enter specific instructions relating to algorithm parameters.

Figure 3A:
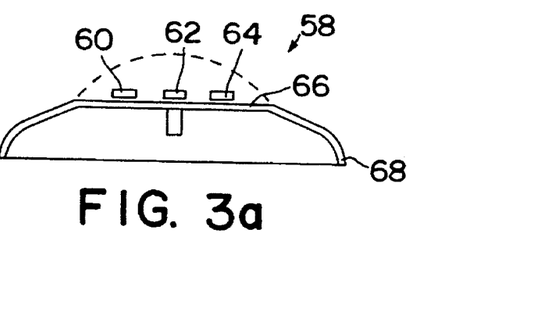
FIGS. 3a and 3b are side and top plan views respectively of a first antenna array unit illustrating the relationship of the three discrete antennae arranged in a triangular configuration.
Figure 3B:
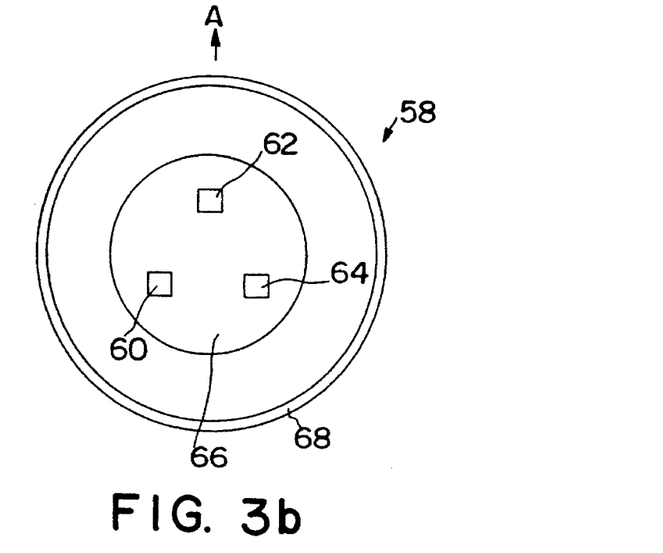
Figure 3C:
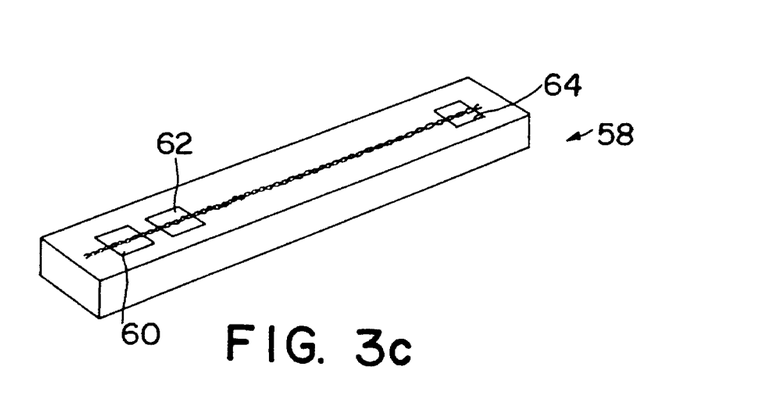
FIG. 3c is a perspective view of a second antenna array unit illustrating the relationship of three discrete antennae arranged in a two base-line configuration.

Referring now to FIGS. 3a and 3b, there are illustrated therein side and view top plan illustrations of the antenna array assembly 58 of the instant invention. The antenna array consists of three discrete antenna 60, 62, and 64. The antenna array 58 further includes a ground plane 66 adapted to reduce multipath and antenna differential phase errors. The antenna ground plane 66 is circular with a rounded flanged edge 68. The rounded flanged edge 68 preferably has a radius of ¼ of the carrier wavelength i.e., approximately 0.05 m. The ground plane is also adapted to minimize antenna phase center error. The discrete antenna 60, 62, and 64 are arranged in the circular ground plane 66 such that they are equi-distant from the edges of the ground plane. This acts to reduce antenna differential phase error. In a preferred embodiment, the antenna array 58 is fabricated of machined aluminum to assure a smooth surface. The antenna array 58 is mounted on a vehicle platform, for example a naval vessel, such that arrow A is arranged towards the front of the vessel.

The antennas themselves are conventional GPS antennas such as Ball Communication Systems Division Model No. AN496C. In a first preferred embodiment of the instant invention, the three antennas 60, 62, and 64 are arranged in an equilateral triangle. In a further preferred embodiment the length of each arm of the equilateral triangle is approximately 0.17 meters. In another preferred embodiment of the instant invention illustrated in FIG. 3c, the antennas 60, 62, and 64 of antenna array 58 are arranged in a two baseline configuration. One baseline being relatively long, on the order of approximately 0.85 meters, is defined by the relationship between antennas 60 and 64. The second baseline is relatively short, being on the order of approximately 0.14 meters, and defined by the relationship between antennas 60 and 62. It will be apparent to one of ordinary skill in the art that other configurations of antennas within the antenna array are possible and may be advantageously applied for a particular application. The antenna array may further include other elements, such as pendulum elements for correcting for pitch and roll of the antenna array when mounted on, for example, a naval vehicle. Alternatively, such elements may not be necessary on other applications.

Turning to FIG. 4, a flow diagram is shown illustrating the attitude determining algorithm of the present invention. The algorithm consists of three main components, namely a satellite constellation selection process 70, comprising steps 74–78, a coarse search 71 comprising steps 80–92, and a fine search 72 comprising steps 94–106. As noted above, the attitude determining system algorithm is embedded in the microprocessor 50 of FIG. 2. In general, both the coarse and fine searches select a number of search attitude estimates, and models the single differenced phase measurement for each attitude estimate. Each search has a designated methodology as to how each trial attitude is selected. The errors between the modeled and measured phases are calculated for each estimate, and the attitude estimate with the minimum error is considered the attitude solution.

Prior to the start of the coarse search, data is read in measured phases from receivers 44, 46 and 48 of FIG. 2, as indicated by block 74. Prior to calculating attitude, other algorithms must first select the best satellite constellation—the four GPS satellites from which telemetry reception is best—from among the entire constellation of GPS satellites available at any given time. The phase is first measured at each receiver as illustrated in block 74. Those measurements are then single differenced, and double differenced as in block 76. Single differencing refers to taking the difference in the phases of the carrier waves between two antennas along an antenna baseline. Single differencing the phase measurements removes satellite clock errors, some level of multipath errors, and errors caused by selective availability. Those single differenced results are then differenced again between satellites, yielding a double differenced set of phases as indicated by block 76. Double differencing removes errors such as receiver clock errors, electrical path length errors, and non-synchronous receiver errors. If inclinometers are being used, the microprocessor reads data relating to pitch and roll from the inclinometers, as shown by block 78.

An example of single differencing is as follows and relates to the equilateral triangle configuration illustrated in FIG. 3b and the associated receivers:

Assuming baseline 1 consists of Receiver 62 and Receiver 64;

Assuming baseline 2 consists of Receiver 62 and Receiver 60;

Assuming baseline 3 consists of Receiver 64 and Receiver 60;

$$\alpha_i 1 = \phi_{i62} - \phi_{i64}$$

$$\alpha_i 2 = \phi_{i62} - \phi_{i60}$$

$$\alpha_i 3 = \phi_{i64} - \phi_{i60}$$

where i=1 to N, and N is the number of satellites, and $\phi_{ix}$=Phase measurements from satellite "i" at Receiver X, where X=62, 64, or 60.

The single differencing measurement is then:

$$\phi = \begin{bmatrix} \alpha_{i1} & \alpha_{i2} & \alpha_{i3} \\ \bullet & & \bullet \\ \bullet & & \bullet \\ \bullet & & \bullet \\ \alpha_{N1} & \alpha_{N2} & \alpha_{N3} \end{bmatrix}$$

Double differencing, therefore, involves using the same calculations for multiple baseline as follows:

$$\overline{\Theta} = \begin{bmatrix} \beta_{11} & \beta_{12} & \beta_{1M} \\ \bullet & & \bullet \\ \bullet & & \bullet \\ \bullet & & \bullet \\ \beta_{D1} & \bullet \bullet \bullet & \beta_{DM} \end{bmatrix}$$

where D=$(N^2-N)/2$; j=1 to M; M is the number of baselines; and $$\beta_{1j} = \alpha_{1j} - \alpha_{2j}$$
$$\beta_{2j} = \alpha_{1j} - \alpha_{3j}$$
$$\beta_{3j} = \alpha_{1j} - \alpha_{4j}$$
$$\beta_{4j} = \alpha_{2j} - \alpha_{3j}$$
$$\beta_{5j} = \alpha_{2j} - \alpha_{4j}$$
$$\beta_{6j} = \alpha_{3j} - \alpha_{4j}$$
•
•
•
$$\beta_{mj}$$

Thereafter, the attitude determining system performs a gross estimate of attitude, accurate to within about 10–50 degrees, and preferably 20–30 degrees. Using double differencing of carrier phase measurements from among the three antenna baselines, attitude is determined to within ±0.5 degrees. The purpose of coarse search 71 is to get a gross estimate of the attitude, with as few calculations as possible. Calculation of the attitude estimate may be illustrated by FIG. 5.

Referring to FIG. 5 an x-y coordinate graph is shown where azimuth is plotted on the abscissa, and the LMS error is plotted on the ordinate for an antennae platform pointed at 345° and oriented at 0° pitch and 0° roll. The course search provides an approximate azimuth somewhere along the global minimum of curve 118.

The coarse search 71, in FIG. 4, provides an estimate of the accuracy of the modeled phases for each of the trial attitude estimates by means of the least root squared error. The least root squared errors are calculated by comparing the measured and modeled double differenced phases. The lowest point on curve 118 represents the estimate whose modeled phases are closest to the measured phases.

More specifically, the coarse search 71 models phases at selected attitude estimates to determine the rough attitude of the vehicular platform. The estimates are selected in an incremental fashion about a solution space. It is preferable to limit the solution space using information such as a previous attitude solution or measurements from the pitch and roll inclinometers 52 and 54 if present. A user of the attitude determining system may select the particular estimate increment which can range from 1° to 30°. In FIG. 5, for example, if the pitch and roll measurements were each 0.5°, the solution space could be constrained to:

0°≦Azimuth≦360°

0°≦Pitch≦1°(0.5°inclinometer accuracy assumed)

0°≦Roll≦1°(0.5°inclinometer accuracy assumed).

Then, if the increment was 10°, the azimuth estimate would approximately equal 350°. If the inclinometers were not used, the previous solution :attitude would be used to constrain the pitch and roll dimensions to + and − the increment from the previous pitch and roll.

Turning back to FIG. 4, the specific steps of the coarse search 71 will now be described. The first step, as indicated Box 80, limits the search range in the coarse search. In this example, Box 80, would limit the search range from:

0°≦azimuth≦360°

0°≦pitch<1°

0°<roll≦1°

Box 82 models these single differenced phases for the attitude estimate. The next step as indicated in Box 84 performs double difference calculations for the modeled phases. Next, Box 86 computes error for the attitude estimates. The modeled phases are then compared to the measured phases. Boxes 88 and 90 compare the calculated error for each of the attitude estimates, and if the current estimate has the least error—in other words, the modeled phase is most like the measured phases—it is kept for the current "best estimate". Box 92 then adds an increment to the current estimate, so that the next estimate goes through the steps in Boxes 80 through 86. If this estimate has a lower error than all of the previous ones, it then becomes the "best estimate". Once all of the estimates and the solution space have been tried, the algorithm passes to the fine search 72.

In the fine search, Box 94 serves as a counter to ensure that all of the estimates closest to the current "best estimate" are tried. Box 96 then increments the "best estimate" according to the index of the counter to determine the value of the current estimate to be modeled and tried. Next, the single differenced phases for the attitude estimates are modeled as shown by Box 98. Box 100 indicates the next step which involves performing the double difference calculations for the modeled phases single differenced in box 98. Once this calculation is performed, the error for the attitude estimates is calculated, as indicated by Box 102. The modeled phases are compared to the measured phases. As indicated by Box 104, the calculated error for each of the attitude estimates is compared, and if the current estimate has the least error (modeled phases most like the measured phases) it is kept for the current "best estimate". The "best estimate" calculations are indicated in Box 106. After the "best estimate" of the trials is determined, the process goes through a second iteration, until the next "best estimate" is found. This process continues until no other "best estimates" are obtained after going through an entire iteration. Box 106 stores the current best estimates.

The purpose of the fine search, generally indicated 72, is to accurately determine attitude/azimuth to 0.5° or greater accuracy. The iterations in the fine search calculate the global minimum of curve 118 of FIG. 5. In the example in FIG. 5, the fine search would calculate a minimum of 345°, starting from a course search estimate of 350°. The fine search also models phases at selected attitude estimates, but the way in which the estimates are selected differs in the fine search. The search tries a number of the closest attitude estimates to the current "best estimate" to model. For example, if the current "best estimate" were (350°, 0.5°, 0.5°) (azimuth, pitch, roll), and the interval size was 2°, then 26 estimates would be shown as follows:

EXAMPLE I 26 trials for 1 increment of the Fine Search assumes current "best estimate" is (350°, 0.5°, 0.5°), and search interval is 2°

| | | |
|---|---|---|
| (350°, −0.91°, 1.91°) | (350°, 0.5°, 2.5°) | (350°, 1.91°, 1.91°) |
| (350°, −1.5°, 0.5°) | (350°, 0.5°, 0.5°) | (350°, 2.5°, 0.5°) |
| (350°, −0.91°, −0.91°) | (350°, 0.5°, −1.5°) | (350°, 1.91°, −0.91°) |
| (348°, −0.91°, 1.91°) | (348°, 0.5°, 2.5°) | (348°, 1.91°, 1.91°) |
| (348°, −1.5°, 0.5°) | (348°, 0.5°, 0.5°) | (348°, 2.5°, 0.5°) |
| (348°, −0.91°, −0.91°) | (348°, 0.5°, −1.5°) | (348°, 1.91°, −0.91°) |
| (352°, −0.91°, 1.91°) | (352°, 0.5°, 2.5°) | (352°, 1.91°, 1.91°) |
| (352°, −1.5°, 0.5°) | (352°, 0.5°, 0.5°) | (352°, 2.5°, 0.5°) |
| (352°, −0.91°, −0.91°) | (352°, 0.5°, −1.5°) | (352°, 1.91°, −0.91°) |

The size of the increment utilized in the fine search is dependent on the size of the error. The object is to minimize the number of iterations of the search, so the interval size depends on how close the estimates are to the final solution. For example, a larger error would require a larger interval between the estimates, and, as the search spirals in on the solution, the interval gets progressively smaller. Phase modeling, as in blocks 96 and 98 of fine search 72 is then conducted as follows:

Sample Calculation for Phase Modeling

Given an attitude estimate ($\hat{AZ}$, $\hat{EL}$, $\hat{RL}$), compute AZ and EL for each baseline as follows:

1. Calculate a local pointing vector.

$$x_i = \cos(\hat{AZ}_i)\cos(\hat{EL}_i)\hat{i} + \sin(\hat{AZ}_i)\cos(\hat{EL}_i)\hat{j} + \sin(\hat{EL}_i)\hat{k}$$

where i=1 to M and M=the number of baselines

2. Transform the vector measurements into global earth-centered, earth-fixed ("ECEF") coordinates.
$\overline{X}_i = x_i LR^T$
where $x_i$=3×1 matrix, which is the local pointing vector of baseline "i";

$\overline{X}_i$=3×1 matrix, which is the ECEF vector of baseline "i";
LR=3×3 matrix, which is the transformation matrix from local to ECEF coordinates; i=1 to M; and M=the number of baselines.

3. Multiply $\overline{X}_i$ by the receiver to satellite vectors (R) to get the single differenced phrase divided by the carrier phase wavelength (λ=0.1902 m).

$$R\overline{X}_i = \frac{1}{\lambda}\Theta_i$$

where R=(N×3) matrix of Rx to satellite vectors and N=the number of satellites, and $\Theta_i$= the $i^{th}$ column of the Θ matrix and i=1 to M and M=the number of baselines.

Thereafter, the attitude determining system algorithm computes for error, as illustrated in block 102 of fine search 72, as follows:

$$LMS\ error = \sqrt{\sum_{i=1}^{D}\sum_{j=1}^{M}(\beta_{ij} - \hat{\beta_{ij}})^2}$$

where $\beta_{ij}$ is the $i^{th}$ row, jth column element of the $\overline{\Theta}$ matrix derived from the measured phases, and $\hat{\beta_{ij}}$, is the ith row, jth column element of the $\overline{\Theta}$ matrix derived from the modelled phases from the given attitude estimate ($\hat{AZ}$, $\hat{EL}$, $\hat{RL}$).

In this manner, the algorithm illustrated in FIG. 4 compares information received from receivers to determine the attitude of a vehicle carrying an attitude determining system. The system repeats these calculations continuously to yield constantly updated attitude information.

Figure 6:
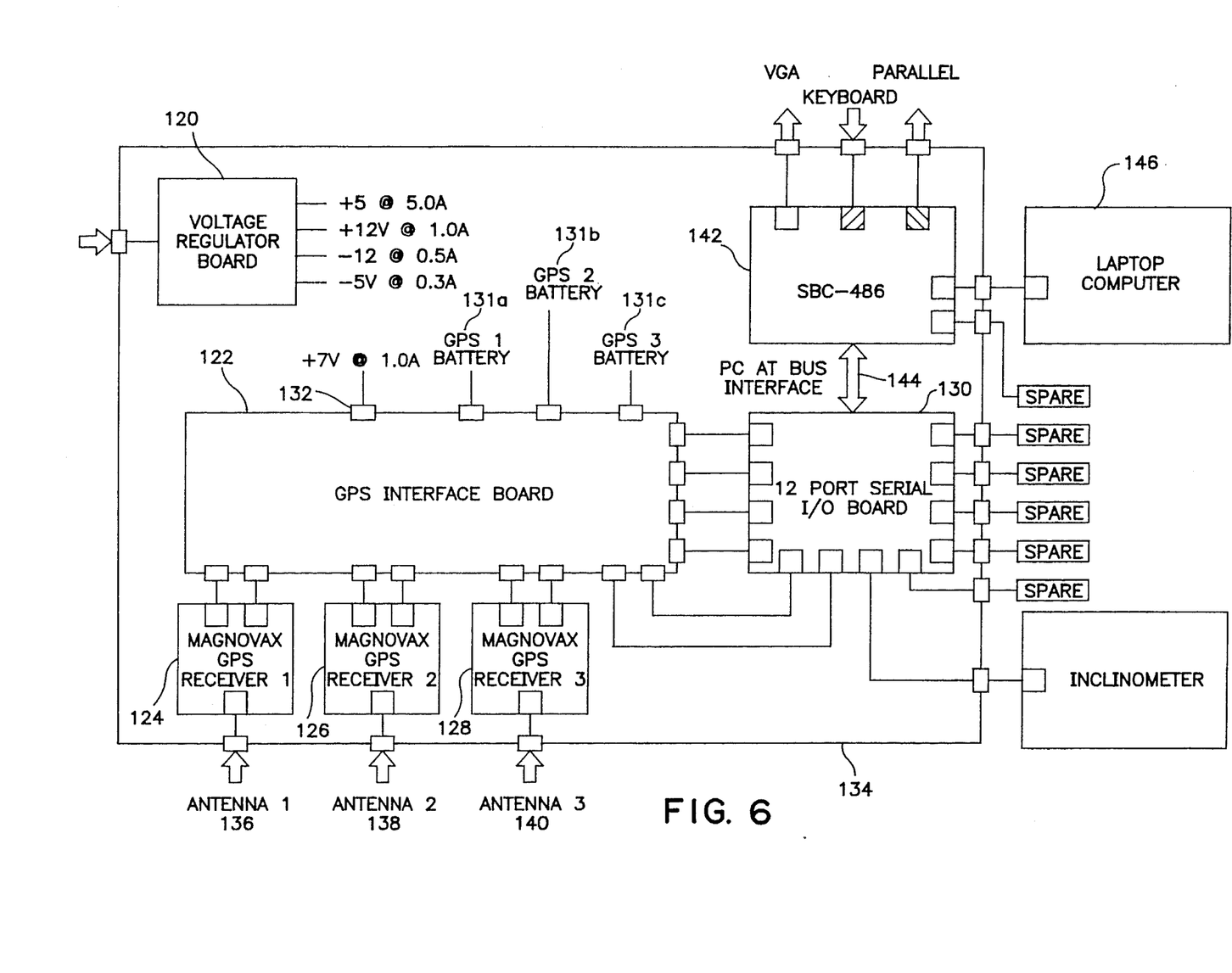
FIG. 6 is a circuit diagram of the major components of the attitude determining system including, but not limited to, the microprocessor means, receiver boards, converter boards, expansion boards, and input/output means interface units.

FIG. 6 illustrates a circuit diagram of the major components of the attitude determining system. The attitude determining system includes a voltage regulator board 120 which provides power to the attitude determining system. In a preferred embodiment, the voltage regulator board 120 accepts between 12 to 32, volts DC and converts it into the following four voltages: +5 V at 5:0A, +12 V at 1.0A, −12 V at 0.5A, and −5 V at 0.3A. The attitude determining system also includes interface board 122 which electrically connects receivers 124, 126 and 128 to input/output board 130. Driver chips (not shown) such as commonly available RS232 driver chips, are preferably provided on board 122 to allow interfacing with input/output board 130. Interface board 122 also includes backup batteries 131a, 131b, and 131c to allow receivers 124, 126, and 128 to store their almanac data after the attitude determining system has been turned off.

Interface board 122 also generates any specialized voltages which are required to operate the attitude determining system. For example, receivers 124, 126, and 128 preferably comprise Magnavox GPS receivers and require +7 V at 1.0A which may be provided to interface board 122 via connector 132, in a manner commonly known in the art.

Receivers 124, 126, and 128 are integrated into chassis 134. Receiver boards 124, 126 and 128 collect all of the data required to perform attitude calculations. Antennas 136, 138, and 140 electrically communicate with receivers 124, 126, and 128, respectively, and are attached via, for example, coaxial cables, to chassis 134. In a preferred embodiment, antennas are Three Ball AN496C antennas and are mounted as depicted in FIG. 3.

Interface board 132 electrically communicates with input/output board 130. The input/output board 130 preferably consists of 12 serial ports which may interface with receivers, inclinometers, and other hardware components of the attitude determining system. Input/output board 130 electrically communicates with microprocessor 142 via bus interface 144. Microprocessor 142 also receives electrical signals from external computer 146 corresponding to instructions entered into computer 146 by a user. Microprocessor 142 is adapted to perform the algorithm illustrated in FIG. 4.

In describing the invention, references have been made to a preferred embodiment and an illustrative advantages of the invention. Tho:se skilled in the art, however, and familiar with the instant disclosure of the subject invention, will recognize additions, deletions, modifications, substitutions, and other changes which will fall within purview of the subject invention and claims.

We claim:

1. A system employing telemetry and other electronic signals provided by a series of orbiting satellites to provide a real-time solution of direction of travel; and attitude, which is comprised of heading, pitch, and roll, of a platform on which said system is located, said system comprising:

antenna array means comprising at least two discrete antennae, each antenna forming at least one baseline with another of said antenna, said antenna array adapted to collect said telemetry and electronic signals transmitted by the series of orbiting satellites, wherein said discrete antennae are spaced such that the length of at least one of said baselines is less than the carrier wavelength being received from said orbiting satellites;

receiver means electrically communicating with each said discrete antenna, and adapted to interpret telemetry and electronic signals collected by said antenna array means;

mathematical algorithmic comparing means adapted to comparing information received from each said receiver means, to calculate heading, pitch, and roll and to reduce errors inherent in said received telemetry and electronic signals, wherein said algorithmic comparing means further includes a coarse attitude determining means for determining a first, general attitude, with accuracy between about +/−30°, and a fine attitude determining means for improving the accuracy of said first determination to within about +/− 0.5°, which occurs within the same solution time-frame, said algorithmic comparing means further including a satellite selecting regime for selecting one or more preferred satellites from among said series of orbiting satellites, and wherein said attitude is determined by carrier phase interferometry; and microprocessor means for processing said information with said algorithm to accurately determine the attitude, heading, pitch, and roll of the platform.

2. A system as defined in claim 1 further comprising an inclinometer means wherein said mathematical algorithm comparing means compares information received from said receiver means and said inclinometer means to reduce error.

3. A system as defined in claim 1, and further comprising:

input/output means for receiving input by a user and electronically transmitting said input to said microprocessor means to enable a user to interact and define parameters of said system.

4. A system as defined in claim 3, wherein said input/output means comprise a touch-sensitive liquid crystal display.

5. A system as defined in claim 1, and wherein said antenna array means further comprises:

three antennae arranged in a triangular configuration, each of said antennas forming a baseline with another of said antennae.

6. A system as defined in claim 5, wherein said three antennae are arranged on a ground plane in an equilateral triangle.

7. A system as defined in claim 6, wherein the length of each arm of the equilateral triangle is less than the wavelength of the telemetry and electronic signals provided from said orbiting satellites.

8. A system as defined in claim 5, wherein said antennae ground plane is substantially circular in shape and has a rounded flanged edge; and said antennae being arranged in said circular ground plane such that said antennae are substantially equal distance from said edges of said ground plane.

9. A system as defined in claim 1, wherein said antenna array further comprises three discrete antenna arranged in two co-linear baselines.

10. A system as defined in claim 1, wherein said attitude is determined by double differenced, carrier phase interferometry.

11. A system for calculating the location, attitude, and direction of a platform, said system comprising:

means adapted to collect and receive telemetry and other electronic signals transmitted at a preselected wavelength from a plurality of earth orbiting satellites, said collecting and receiving means comprising at least three antenna, each antenna electrically communicating with a receiver;

satellite selection means embedded in a microprocessor and adapted to select at least four satellites from among the plurality of orbiting satellites from which to receive telemetry;

error correcting means embedded in said microprocessor to reduce errors inherent in said received telemetry and electronic signals attributable to said antennae and the location of said satellites; and an algorithm employing double differenced carrier phase interferometry to determine location, attitude and direction of travel based upon the telemetry and electronic signals received from said selected satellites, wherein said algorithm further includes a coarse attitude determining means for determining a first, general attitude, with accuracy between about +/−30°, and a fine attitude determining means for improving the accuracy of said first determination to within about +/−0.5°.

12. A system as in claim 11, wherein said three antenna are arranged in an equilateral triangle, the distance between each such antenna being less than the wavelength of the transmitted telemetry.

13. A system as in claim 11, wherein said antenna are arranged in two co-linear baselines.

14. A system as in claim 11, further including at least one inclinometer operatively associated with such system for establishing the orientation of such system, said orientation information being combined with said telemetry and said other electronic signals to more accurately determine attitude.

15. A system as in claim 11, further including input/output means for receiving input from a system user, and electronically transmitting said input to said microprocessor means to enable said user to interact with, and to define parameters within said system.

16. A system as in claim 15, wherein said input/output means comprise a touch sensitive liquid crystal display.

17. A system as in claim 11, wherein said error correction means further comprises means adapted to correct for antenna differential phase error due to antenna phase center migration; electrical path length difference attributable to differences in spacing between said antenna; and multi-path induced phase error resulting from reception of said telemetry and electronic signals reflected off of objects other than said antenna.

18. A system as in claim 11, wherein said satellite selection means selects said satellites by comparing the relative strength of signals received from each one of said plurality of satellites.

19. A system as in claim 12, wherein said antennae are arranged in a ground plane which is substantially circular in shape and has a rounded flanged edge, said antennae being arranged in said circular ground plane such that said antennae are substantially equal distance from said edges of said ground plane.

20. A method of determining location, attitude, and direction of travel information from signals transmitted from one or more earth orbiting satellites, said method comprising the steps of:

providing means adapted to collect and receive telemetry and other electronic signals transmitted at a preselected wavelength from said plurality of earth orbiting satellites, said collecting and receiving means comprising at least three antenna, each antenna electrically communicating with a receiver;

providing an algorithm imbedded in a microprocessor, said algorithm employing carrier phase interferometry to interpret said received telemetry and electronic signals, said algorithm comprising:

satellite selection means embedded in said microprocessor and adapted to select at least four satellites from among the plurality of orbiting satellites from which to receive telemetry; and error correcting means embedded in said microprocessor to reduce errors inherent in said received telemetry and electronic signals;

relaying information received by said antenna and receiver to said microprocessor for calculation of attitude, location, and direction of travel information by said algorithm;

establishing a first coarse measurement of attitude, with accuracy between about +/−30°, and subsequently establishing a second, fine measurement of attitude improving the accuracy of said first determination to within about +/−0.5°; and displaying attitude, location, and direction of travel information on an output device.

21. A method as in claim 20, including the further step of calculating said attitude by employing double differenced carrier phase interferometry.

22. A method as in claim 20, including the further step of providing said three antenna arranged in an equilateral triangle, the distance between each such antenna being less than the wavelength of the transmitted telemetry.

23. A method as in claim 20, wherein the output means comprise a touch sensitive liquid crystal display.

24. A method as in claim 20, including the further step of arranging said antenna in two co-linear baselines.

* * * * *